Patented Oct. 23, 1951

2,572,562

UNITED STATES PATENT OFFICE 2,572,562

ALUMINUM ALLOY

Richards H. Harrington, Schenectady, N. Y., assignor to General Electric Company, a corporation of New York No Drawing. Application April 1, 1948,
Serial No. 18,481

8 Claims. (Cl. 75—147)

The present invention relates to aluminum base alloys characterized by a high creep strength and high electrical conductivity. The invention is also concerned with dynamo electric machines specifically electric generators, the rotor windings of which comprise the improved alloys of the present invention.

Aluminum has been used for some time in the electrical industry, for example in transmission lines, busbars and cables. For such uses, it has usually been specified that the conductivity of the aluminum shall equal or exceed a certain minimum value. To meet this minimum electrical conductivity value there has been developed a conductor grade aluminum also known as electrical conductivity aluminum (E. C. aluminum) which is of higher purity than commercial aluminum and has a conductivity of approximately 61 per cent of the conductivity of pure annealed copper.

Aluminum has also been considered for and used as a substitute for copper in the windings of dynamo electric machines such as electric generators.

For copper-wound electric generators there is a maximum size for a given operating speed of rotation. Beyond this size (or diameter) the generator may fail electrically. When centrifugal forces set up stresses in the copper winding that exceed the creep strength of the copper, the copper windings flow, or deform plastically, resulting in distortion, breaking of the insulation, and electrical shorting of turns in the winding. Due to design, that is, the directional restraint of the windings in their slots, the actual failure is due to creep in compression.

From a design standpoint it was obvious that for windings for the same size generator, aluminum, with its density of about one-third that of copper, would develop in itself much lower centrifugal stresses than would copper. Thus, if aluminum has the same creep strength as copper, use of aluminum windings would permit the use of larger generators or higher speeds of rotation (or both). Also, for practical efficiency, the minimum electrical conductivity desired for aluminum would be about 58 per cent (related to pure copper=100 per cent).

The electrical conductivity grade of aluminum which has been used as generator windings has an electrical conductivity in the range of 60-62 per cent and, to maintain this conductivity at a reasonable cost and on a commercial basis, the composition has been restricted as follows: 99.45 per cent minimum of aluminum, 0.3 to 0.45 per cent iron, up to about 0.1 per cent silicon, and only spectrographic traces (up to 0.01 per cent) of other impurities, such as magnesium, etc.

To further strengthen aluminum winding material, it is usually cold worked from 10 to 20 per cent. However, in the operation of many dynamo electric machines such as turbine generators, the temperatures of the windings may be as high as 125 to 140° C. and at such temperatures it has been found that the aluminum windings can fail in compression creep in the same manner as did the copper windings due to the fact that E. C. grade of aluminum is too low in creep strength when held at such elevated temperatures over long periods of time.

It is therefore a primary object of the present invention to provide a high conductivity grade of aluminum which is characterized also by a high creep strength.

A further object of the invention is to provide a new and improved aluminum-wound rotor for dynamo electric machines which can be operated at ordinary operating temperatures without failure due to creeping of the windings.

These objects are attained in accordance with the present invention by providing as the conductor material, and more specifically as a rotor winding, an aluminum alloy containing 0.2 to 1.1 per cent iron, from a trace to 0.15 per cent silicon, from 0.2 to 0.5 per cent magnesium, balance substantially all aluminum excepting for spectrographic traces of impurities, such as magnesium and copper, which along with small amounts of iron and silicon are usually associated with aluminum.

More specifically, it has been found that the addition of small amounts of magnesium and iron to pure aluminum or a small amount of magnesium to E. C. grade aluminum results in a marked improvement of the creep strengths, rupture strengths, or both, of the base metal or alloy, without substantially altering the electrical conductivities thereof.

For generator rotor winding applications the most suitable material would be one having the highest creep strength or lowest creep rate in compression at about the maximum operating temperature of the apparatus plus an electrical conductivity which to be acceptable should be at least 58 per cent. As the result of a number of tests on numerous alloys obtained by adding small amounts of different elements to pure aluminum (99.95 per cent aluminum) or to E. C. grade aluminum, it was found that to meet the minimum conductivity requirements and to possess a creep rate substantially better than that of either pure aluminum or E. C. grade, the alloy should contain from 0.2 to 1.1 per cent iron, from 0.2 to 0.5 per cent magnesium, and from a trace to 0.15 per cent silicon, balance aluminum excepting normal spectrographic traces of impurities. Particularly useful alloys are those containing from 0.2 to 1.0 per cent, preferably 0.3 to 0.45 per cent, iron, from 0.2 to 0.5 per cent, preferably 0.2 to 0.3 per cent, magnesium, and from 0.05 to 0.15 per cent, preferably 0.1 per cent, silicon, balance aluminum, which alloy has a creep rate only about one-tenth that of E. C. grade aluminum. In the preferred alloys the magnesium should be present in an amount slightly in excess of that calculated as necessary to convert all of the silicon to $Mg_2Si$.

The improvements obtained in accordance with the present invention will become more apparent from the following test results in which the properties of three alloys A, B, and C, coming within the scope of the present invention are compared with an alloy D which is an E. C. grade aluminum:

| Alloy | Composition |
|---|---|
| A | 1.05 Fe—0.32 Mg—bal. Al. |
| B | 0.53 Fe—0.29 Mg—bal. Al. |
| C | 0.43 Fe—0.32 Mg—0.10 Si—bal. Al. |
| D | 0.41 Fe—0.005 Mg—0.10 Si—bal. Al. |

Alloy A contains twice as much iron as alloy B. Alloys B and C have similar content of iron and magnesium but alloy C also contains about 0.10 per cent silicon. Alloys C and D contain about equal amounts of iron and silicon but alloy D contains only a spectrographic trace of magnesium ordinarily present in aluminum. Alloy C was made by remelting some stock of alloy D analysis and adding 0.3 per cent magnesium to that melt. Alloy D, in turn, is representative of E. C. grade aluminum and was purchased as such. Thus alloy C is a very easy and low cost alloy to make.

All four materials were given identical fabrication treatments as follows:

1. Cast into 1¼" square ingots.
2. Machined to 1⅛" square to give clean smooth surfaces.
3. Hot rolled at 400° C. down to 390 mils thick bar, about 1⅛" wide.
4. Annealed 4 hours at 450° C. (treatments 3 and 4 completely replace the initial cast structure with a typical wrought structure).
5. Finish cold rolled 10 per cent reduction to increase strength properties as for generator winding use.
6. Aged 5 hours at 200° C. to stabilize the material for subsequent use at temperatures between room temperature and 200° C. (For generators, the range of 100–140° C. during operation.)

While the materials were aged for 5 hours at 200° C. a shorter treatment of about 1 hour is ordinarily sufficient and will effect the unusual improvement in properties observed for alloy C.

Stock, so treated, was used for the hardness, proportional limit (in compression), creep rate (in compression), and electrical conductivity tests.

*Compression creep rate tests on alloys A, B, C and D*

Compression creep tests for all four materials were made under an applied load of 5130 p. s. i. at 140° C. Creep, in micro-inches per inch was plotted against time. As for all creep curves for all alloys, there was an initial brief period of relatively rapid creep rate followed by the "second stage" of creep that characterizes long time useful performance of the material at the operating temperature. The "rate of creep" is the slope of this second stage part of the creep curve. The amount of creep is measured in micro-inches per inch while the creep rate as given in the following table is expressed as micro-inches per inch per 1000 hrs. (or total creep per 1000 hrs.).

| Alloy | A | B | C | D |
|---|---|---|---|---|
| Creep Rate | 475 | 375 | 94 | 986 |

By ratios of the respective creep rates it is readily apparent that alloy A gives half the creep rate of E. C. grade aluminum, alloy B is somewhat better than A, while alloy C has an astoundingly low creep rate of less than one-tenth that of the standard E. C. grade aluminum probably due to the presence of effective amounts of both magnesium and silicon. The creep rate of alloy C is so low that it was difficult to measure while that of E. C. grade is high enough to prove destructive under certain use conditions. That the addition of only 0.3 per cent magnesium to E. C. grade aluminum should decrease the creep rate by 90 per cent is most surprising.

| Alloy | C | D |
|---|---|---|
| | P. s. i. | P. s. i. |
| Compression P. L. at room temperature | 12,500 | 5,700 |
| Compression P. L. at 140° C | 8,500 | 2,500 |

Since it is known that, for such materials, the proportional limit is just below the practical elastic limit, alloy C will obviously take a short time static load at room temperature more than twice that for E. C. grade aluminum before suffering plastic deformation. At 140° C., alloy C has more than 200 per cent advantage over E. C. grade aluminum. This marked superiority of alloy C in elastic strength is in line with its 10 to 1 superiority in compression creep. These tests also indicate a greater thermal stability for alloy C.

The following table shows the superiority in hardness of alloy C over standard E. C. grade aluminum at various stages of fabrication, as for example in the manufacture of generator winding:

| | Alloy C | Alloy D |
|---|---|---|
| After hot rolling | 92.5 R. H.[1]<br>47.5 Brinell | 81 R. H.[1]<br>35.8 Brinell. |
| After annealing | 45 R. H.<br>25 Brinell | 23 R. H.<br>20 Brinell. |
| After 10 per cent cold rolling | 76 R. H.<br>34.4 Brinell | 62 R. H.<br>27 Brinell. |
| After strain relief, 5 hrs. at 200° C | 88 R. H.<br>42.4 Brinell | 57 R. H.<br>25 Brinell. |

[1] R. H.=Rockwell hardness, H scale.

It is obvious from these data that alloy C is harder and stronger than standard E. C. grade aluminum. The aging treatment for strain-relief of cold worked metals and solid solution alloys normally either affects the hardness and tensile properties not at all, or causes both to be slightly lowered. These data show that the hardness and strength properties are slightly lowered for strain relief treated E. C. grade aluminum. However, alloy C has its hardness and tensile properties increased appreciably by the strain-relief aging treatment. For maximum strength and creep resistance, alloy C is preferably used in this aged condition (subsequent to the finish cold-rolling). The hardness effects from the strain-relief treatment at 200° C. further indicates that alloy C has excellent thermal stability whereas E. C. grade aluminum has relatively poor thermal stability. In other words, alloy C possesses a considerably higher maximum service temperature than does E. C. grade aluminum. This may be due to strain-induced precipitation of Mg$_2$Si in alloy C.

As shown by the following test results on electrical conductivity, alloys A and B, possessing half the creep rate of E. C. grade aluminum (alloy D), are equal to E. C. grade aluminum. Alloy C, possessing one-tenth the creep rate of E. C. grade aluminum, has an electrical conductivity only slightly lower than that of E. C. grade aluminum:

*Electrical conductivities of alloys A, B, C and D*

| Alloy | A | B | C | D |
|---|---|---|---|---|
| Electrical conductivities: | | | | |
| Cold Rolled | 60.7 | 61.0 | 58.6 | 61.0 |
| Annealed | 61.2 | 61.5 | 60.5 | 61.5 |

Alloys of the type of alloy C containing 0.25–0.45 per cent iron, .05–0.15 per cent silicon, 0.2–0.5 per cent magnesium, balance aluminum, in the cold worked and aged condition, can be expected to have electrical conductivities between 58 and 60 per cent depending upon the actual analysis of each specific stock. The higher conductivity can be expected when the magnesium content just balances or slightly exceeds the silicon content to form Mg$_2$Si and the iron is low in the range. However, the higher iron favors a higher recrystallization range. In any case as a close control on composition results in high cost, a satisfactory commercial alloy can be obtained merely by adding 0.2 to 0.5 per cent magnesium (0.3 per cent preferably) to the E. C. grade aluminum.

In alloys of the type A and B having silicon contents less than 0.05 per cent and usually less than 0.03 per cent, the amounts of Mg$_2$Si formed by reaction of the magnesium and silicon are insignificant so that the effects of the magnesium and iron are controlling. These low silicon alloys are thus characterized by a higher conductivity than alloys of the type C while their creep rates are substantially lower than the creep rate of E. C. grade aluminum.

What I claim as new and desired to secure by Letters Patent of the United States, is:

1. An aluminum base alloy characterized by a high creep strength and high electrical conductivity, said alloy containing 0.2 to 1.1 per cent iron, 0.2 to 0.5 per cent magnesium, from 0.05 to 0.15 per cent silicon, balance aluminum except for the small amounts of impurities other than iron and silicon ordinarily present in grades of aluminum having an electrical conductivity of at least 60 per cent the conductivity of pure copper the magnesium content of the alloy being slightly in excess of that calculated as necessary to convert all of the silicon to Mg$_2$Si.

2. An aluminum alloy containing 0.3 to 0.45 per cent iron, 0.2 to 0.3 per cent magnesium, 0.1 per cent silicon, balance aluminum except for incidental impurities other than iron and silicon present in grades of aluminum having an electrical conductivity of at least 60 per cent the conductivity of pure copper.

3. An aluminum alloy containing 0.3 to 0.45 per cent iron, 0.2 to 0.3 per cent magnesium, 0.05 to 0.15 per cent silicon, balance aluminum except for incidental impurities other than iron and silicon present in grades of aluminum having an electrical conductivity of at least 60 per cent the conductivity of pure copper, the magnesium content of the alloy being slightly in excess of that calculated as necessary to convert all of the silicon to Mg$_2$Si.

4. A cold worked and aged aluminum alloy containing 0.3 to 0.45 per cent iron, 0.2 to 0.3 per cent magnesium, 0.1 per cent silicon, balance aluminum except for incidental impurities other than iron and silicon present in grades of aluminum having an electrical conductivity of at least 60 per cent the conductivity of pure copper, the magnesium content of the alloy being slightly in excess of that calculated as necessary to convert all of the silicon to Mg$_2$Si.

5. A dynamo-electric machine including a rotor and rotor winding, said rotor winding being an aluminum conductor containing 0.2 to 1.1 per cent iron, 0.2 to 0.5 per cent magnesium, 0.05 to 0.15 per cent silicon, balance aluminum, the magnesium content of the alloy being slightly in excess of that calculated as necessary to convert all of the silicon to Mg$_2$Si.

6. A dynamo-electric machine including a rotor and rotor winding, said rotor winding being an aluminum conductor containing 0.3 to 0.45 per cent iron, 0.2 to 0.3 per cent magnesium, 0.1 per cent silicon, balance aluminum except for incidental impurities other than iron and silicon present in grades of aluminum having an electrical conductivity of at least 60 per cent the conductivity of pure copper.

7. An electric current conductor composed of a cold worked and aged aluminum-base alloy containing 0.2 to 1.1 per cent iron, 0.2 to 0.5 per cent magnesium, 0.05 to 0.15 per cent silicon, balance aluminum, and having an electrical conductivity of at least 58 per cent that of pure copper and a compression creep rate less than about one-tenth that of a corresponding aluminum-base alloy containing only a trace of magnesium.

8. An electric current conductor composed of a cold worked and aged alloy containing 0.2 to 1.1 per cent iron, 0.2 to 0.5 per cent magnesium, 0.05 to 0.15 per cent silicon, balance aluminum, said alloy being produced by cold working an annealed alloy to obtain about a 10 per cent reduction followed by artificial aging of the cold worked alloy at about 200° C.

RICHARDS H. HARRINGTON.

REFERENCES CITED

The following references are of record in the file of this patent:

UNITED STATES PATENTS

| Number | Name | Date |
|---|---|---|
| 1,083,903 | Wilm | Jan. 6, 1914 |
| 1,819,148 | Coates et al. | Aug. 18, 1931 |
| 1,950,197 | Taylor | Mar. 6, 1934 |
| 1,951,874 | Kellar | Mar. 20, 1934 |
| 2,132,274 | Savage | Oct. 4, 1938 |

FOREIGN PATENTS

| Number | Country | Date |
|---|---|---|
| 638,095 | Germany | Nov. 9, 1936 |

OTHER REFERENCES

A. S. T. M. Standards, 1944, Part I, published by the American Society for Testing Materials, 1945, page 1445.

Journal of the Institute of Metals, vol. 41 (1929) page 592.

Journal of the Institute of Metals, vol. 51 (1933) page 196.

Journal of the Institute of Metals, vol. 72 (1946) pages 192–194 and 206.